(12) United States Patent
Joet

(10) Patent No.: US 7,705,760 B2
(45) Date of Patent: Apr. 27, 2010

(54) METHOD AND DEVICE FOR THE FILTERING AND ANALOGUE/DIGITAL CONVERSION OF ANALOGUE SIGNAL

(75) Inventor: Loïc Joet, Grenoble (FR)

(73) Assignee: STMicroelectronics SA, Montrouge (FR)

(*) Notice: Subject to any disclaimer, the term of this patent is extended or adjusted under 35 U.S.C. 154(b) by 0 days.

(21) Appl. No.: 12/015,093

(22) Filed: Jan. 16, 2008

(65) Prior Publication Data

US 2008/0169871 A1 Jul. 17, 2008

(30) Foreign Application Priority Data

Jan. 17, 2007 (FR) .................................. 07 52722
Jan. 9, 2008 (FR) .................................. 08 50113

(51) Int. Cl.
*H03M 1/12* (2006.01)
(52) U.S. Cl. ...................................... 341/155; 341/120
(58) Field of Classification Search ................. 341/155, 341/120; 375/345, 350; 455/232.1, 205, 455/324
See application file for complete search history.

(56) References Cited

U.S. PATENT DOCUMENTS

| | | | |
|---|---|---|---|
| 7,024,169 B2* | 4/2006 | Ciccarelli et al. | 455/232.1 |
| 7,095,803 B2 | 8/2006 | Gazsi et al. | 375/316 |
| 2004/0259509 A1 | 12/2004 | Duello et al. | 455/115.1 |
| 2005/0147192 A1* | 7/2005 | Yamamoto et al. | 375/345 |
| 2007/0080835 A1* | 4/2007 | Maeda et al. | 341/120 |

FOREIGN PATENT DOCUMENTS

| | | |
|---|---|---|
| EP | 0987829 A | 3/2000 |
| JP | 2002141821 | 5/2002 |
| WO | WO/2006055791 | 5/2006 |

* cited by examiner

*Primary Examiner*—Rexford N Barnie
*Assistant Examiner*—Joseph Lauture
(74) *Attorney, Agent, or Firm*—Lisa K. Jorgenson; Allen, Dyer, Doppelt, Milbrath & Gilchrist, P.A.

(57) ABSTRACT

The invention relates to a method for the filtering and analog/digital conversion of an incoming analog signal including an analog filtering of the incoming analog signal so as to filter the frequency components located outside a desired frequency band, and a conversion of the filtered analog signal to a digital signal. The digital signal is reformatted in a form that is substantially similar, at least in the desired frequency band, to the form of the incoming analog signal. A final digital filtering of the reformatted digital signal is performed so as to filter the frequency components located outside the desired frequency band.

25 Claims, 3 Drawing Sheets

METHOD AND DEVICE FOR THE FILTERING AND ANALOGUE/DIGITAL CONVERSION OF ANALOGUE SIGNAL

The present invention relates to the processing of an analog signal, and more particularly to the filtering and analog/digital conversion of such a signal.

The invention applies advantageously, but not exclusively, to the processing of those signals, in particular radiofrequency signals, that comprise a plurality of frequency channels and are subject to one or more frequency transpositions to select a particular channel. Such is the case, for example, for terrestrial digital television signals, or more generally for signals carried in the transmission systems with frequency division multiplexing.

BACKGROUND OF THE INVENTION

An incoming analog signal, for example resulting from one or more frequency transpositions of a basic signal, comprising information located in a desired frequency band (selected channel for example) and frequency components located outside the desired frequency band (channels adjacent to the selected channel), is normally converted to digital form and then subjected to specific processing operations, such as, for example, channel decoding processing operations comprising, in particular, a demodulation and source decoding processing operations.

Before performing the analog/digital conversion, the incoming signal is normally filtered so as to filter the frequency components located outside the desired frequency band (filtering residual adjacent channels, for example).

An advantageous situation would be to filter with a sophisticated filtering transfer function allowing for a minimal distortion of the signal in the desired band (selected channel) and a clear cutoff outside this band. However, for footprint and cost reasons, the analog filters conventionally used are low order and may not therefore offer a sophisticated transfer function. If a good cutoff of the adjacent channels is wanted to limit the dynamic range of the analog/digital converter, the distortion of the band (amplitude-wise and phase-shift-wise) may be greater, and the demodulation may be errored. If the integrity of the band is to be preserved, the filtering may be underdimensioned and the dynamic range at the input of the analog/digital converter may be all the greater.

SUMMARY OF THE INVENTION

There is a device and a method making it possible to improve the analog/digital conversion while reducing the unwanted frequency components (adjacent channels, for example) and preserving a satisfactory integrity of the useful bandwidth of the signal (selected channels, for example).

According to one aspect, there is a method for the filtering and analog/digital conversion of an incoming analog signal comprising performing an analog filtering of the incoming analog signal so as to filter the frequency components located outside a desired frequency band, and converting the filtered analog signal to a digital signal. The digital signal is reformatted in a form that is based upon, at least in the desired frequency band, to the form of the incoming analog signal. A final digital filtering of the reformatted digital signal is performed to filter the frequency components located outside the desired frequency band.

The desired frequency band is, for example, the bandwidth of the useful signal or the width of the desired frequency channel. The aim of the analog filtering is thus to filter, for example, the residual adjacent channels. In this way, the analog filtering makes it possible on the one hand to limit the input dynamic range of the analog/digital converter, and on the other hand to adapt the sampling frequency of the analog/digital converter to the bandwidth of the useful signal. The analog/digital conversion is thus enhanced relative to the useful signal to be converted.

However, in particular when the order of the analog filter is low, for example less than or equal to 2, to obtain a good cutoff of the adjacent channels, the analog filtering may also result in a distortion of the useful signal in the desired frequency band. This distortion may result in a loss of information or a degradation of the useful signal. The reformatting step makes it possible in particular to correct the distortion of the signal provoked by the analog filtering. It is thus possible, despite a low order analog filtering, typically of order 1, on the one hand to limit the dynamic range of the analog/digital converter, and on the other hand to limit the degradation of the useful signal.

The reformatting step makes it possible to recover, at least over the desired frequency band, a signal that is identical or almost identical to the incoming signal before analog filtering.

The final digital filtering then makes it possible to filter the frequencies located outside the desired frequency band. This final filtering is performed digitally and can therefore offer a transfer function that is sophisticated and suited to the spectrum of the signal to be filtered, without being bulky or expensive. It also makes it possible to effectively filter the adjacent channels without distorting the useful band of the signal.

Thus, the useful signal filtering step is deferred during the digital processing part. It is in practice easier and less costly to produce a sophisticated transfer function with a digital filter than with an analog filter. Also, the dynamic range of the analog/digital converter is limited when converting the signal, while avoiding the loss of information or the degradation of the useful signal.

According to one embodiment, the reformatting is performed within a digital reformatting filter having a working frequency equal to the sampling frequency of the analog/digital conversion and having an inverse transfer function of the transfer function of the analog filtering at least in the desired frequency band.

There is therefore obtained, at the output of the reformatting filter, in the frequency band, a signal identical or substantially similar to that which would have been obtained in the absence of analog filtering.

The transfer function of the digital reformatting filter can be calculated from the transfer function of the analog filtering.

According to another embodiment, the reformatting is performed within a digital reformatting filter having a different working frequency, preferably less than the sampling frequency of the analog/digital conversion, and having a transfer function resulting from an approximation of the inverse of the transfer function of the analog filtering, at least in the desired frequency band.

This embodiment relates, more particularly, to the case where the analog/digital converter oversamples the analog signal. The oversampling makes it possible to obtain a digital signal that is more faithful to the analog signal. However, there may be no need to use the same oversampling frequency for the digital processing. Thus, it is advantageous to use a working frequency that is lower than the sampling frequency. In this case, the calculation of the digital equivalent of the inverse transfer function of the analog filtering may be performed differently and can, in particular, be calculated by approximation in the desired frequency band.

More specifically, the digital reformatting filter has, for example, a transfer function, the coefficients of which result from an approximation of the inverse of the transfer function of the analog filtering, at least in the desired frequency band, and the determination of the coefficients advantageously comprises a selection of reference frequencies chosen from the desired frequency band and, for each of these reference frequencies, a minimizing of the difference between the corresponding value of the inverse transfer function of the analog filtering and the corresponding value of the transfer function of the reformatting filter.

In other words, the transfer function of the reformatting filter is calculated in this example by considering a finite number of frequencies chosen from the desired frequency band, and for which the difference between the real value of the transfer function of the reformatting filter and the desired value equal to the inverse of the transfer function of the analog filtering is minimized.

Preferably, the reference frequencies are chosen uniformly from the desired frequency band. The uniform choice of the reference frequencies makes it possible to obtain a correct approximation of the inverse transfer function of the analog filtering by the transfer function of the reformatting filter across the entire width of the desired frequency band.

The order of the analog filtering may be chosen equal to 1 and the approximation of the inverse of the transfer function of the analog filtering may then depend on the order of the digital reformatting filter. In this case, the coefficients of the transfer function of the digital filter may be easier to calculate.

The transfer function of the reformatting filter is, for example, of the finite impulse response type. The transfer function can thus then be expressed in a polynomial form, in which the coefficients are to be determined. In particular, difference-minimizing methods make it possible to determine the coefficients for this type of filter.

Preferably, the reformatting and the final digital filtering are performed within one and the same filter whose transfer function, at least in the desired frequency band, is equal to the product of the transfer function of the reformatting filter and the transfer function of the final digital filter.

This embodiment can be applied whether the working frequency of the filter is equal to or different from the sampling frequency. This embodiment makes it possible to perform the reformatting step and the final digital filtering step at the same time. This makes it possible to avoid obtaining a digital signal with a large number of bits between the reformatting filter and the final digital filtering, because of the reformatting of the signal, even outside the wanted frequency band. The signal obtained at the output of the filter remains the same, but implementing the device is thereby simplified.

In one particular application, the incoming signal is a baseband signal resulting from a frequency transposition of an initial radiofrequency signal. The filtering of the adjacent channels, and of the frequencies located outside the bandwidth of the signal, after transposition, can then be performed using a low-pass filter. The order of the filter will therefore determine the cutoff slope of the filter, and therefore the effectiveness of the filtering on the adjacent channel frequencies. Because of the reformatting and final digital filtering steps, the digital signal obtained at the output of the final digital filter will correspond to the incoming useful signal virtually stripped of the adjacent channels.

According to another aspect, there is a filtering and analog/digital conversion device comprising an input for receiving an incoming analog signal, an analog filter to filter the incoming signal so as to filter the frequency components located outside a desired frequency band, and an analog/digital converter able to convert the filtered analog signal to a digital signal. Moreover, there are reformatting means or circuitry to reformat the digital signal in a form that is based upon the initial form of the incoming signal, at least in the desired frequency band, and additional filtering means or circuitry to perform a final digital filtering of the reformatted digital signal so as to filter the frequency components located outside the desired frequency band.

According to one embodiment, the reformatting means or circuitry comprise a digital reformatting filter having a working frequency equal to the sampling frequency of the analog/digital converter and having an inverse transfer function of the transfer function of the analog filter at least in said desired frequency band.

According to another embodiment, the reformatting means or circuitry comprise a digital reformatting filter having a working frequency that is different from and preferably less than the sampling frequency of the analog/digital converter and having a transfer function resulting from an approximation of the inverse of the transfer function of the analog filter at least in the desired frequency band.

The digital reformatting filter has, for example, a transfer function, the coefficients of which result from an approximation of the inverse of the transfer function of the analog filtering, at least in the desired frequency band, and the coefficients are, for example, determined so that, for each frequency taken from a group of reference frequencies chosen from the frequency band, the difference between the corresponding value of the inverse transfer function of the analog filter and the corresponding value of the transfer function of the reformatting filter is minimal.

The order of the analog filtering may be chosen equal to 1 and the approximation of the inverse of the transfer function of the analog filtering then depends on the order of the digital reformatting filter.

The reformatting filter may be, for example, of the finite impulse response type.

Preferably, the reformatting means or circuitry and the additional digital filtering means or circuitry comprise one and the same filter whose transfer function is equal to the product of the transfer function of the reformatting filter and the transfer function of the final digital filter. The device can be produced in the form of an integrated circuit.

According to another aspect, there is a radiofrequency signal receiver comprising a frequency transposition stage to deliver the incoming signal and a filtering and analog/digital conversion device as defined previously, connected to the output of the frequency transposition stage.

BRIEF DESCRIPTION OF THE DRAWINGS

Other advantages and characteristics will become apparent from studying the detailed description of embodiments and implementations, by no means exclusive, and the appended drawings in which.

DETAILED DESCRIPTION OF THE PREFERRED EMBODIMENTS

Figure 1:
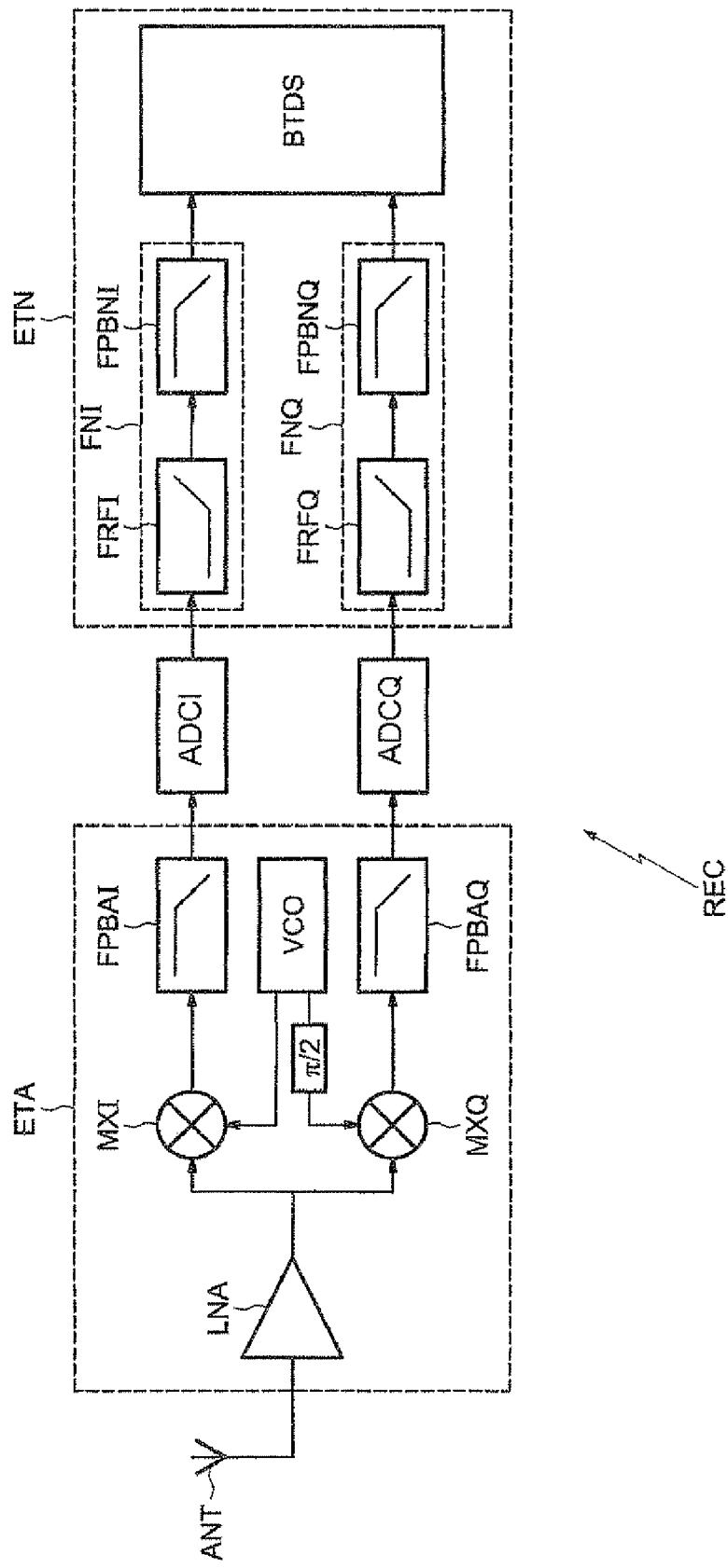
FIG. 1 is a block diagram of the internal structure of one embodiment of a device, in accordance with the present invention.

In FIG. 1, the reference REC denotes a radiofrequency signal receiver. The receiver REC comprises an antenna ANT picking up the signal, a stage ETA for analog processing of the signal and a stage ETN for digital processing of the signal. The analog processing stage ETA and the digital processing stage ETN are separated by an analog/digital conversion stage ADCI and ADCQ.

It is assumed that the signal picked up by the antenna ANT comprises, for example, a number of frequency channels each having a central frequency specific to each channel and a similar band-width.

The analog processing stage ETA starts with a low noise amplifier LNA connected to the antenna ANT. This amplifier LNA is followed by a first frequency transposition stage, in this case formed by two mixers MXI and MXQ. Each mixer MXI and MXQ respectively receives, on the one hand, the signal from the amplifier LNA and, on the other hand, a transposition signal mutually phase shifted by 90°. These transposition signals are obtained, for example, from a voltage-controlled oscillator VCO.

The transposition signal has a frequency equal to the central frequency of the desired channel. Consequently, the useful signal has a central frequency equal or approximately equal to the zero frequency. In other words, there are obtained at the output of the two mixers MXI and MXQ, on the two processing channels I and Q, two analog signals in quadrature and baseband, that is, having the useful signal centered about the zero frequency.

Hereinafter in the text, only one of the two processing channels will be described, for example channel I, it being understood that the channel Q has a similar structure.

At the output of the mixer MXI, there is an analog low-pass filter FPBAI. The aim of the filter SFPBAI is to filter the channels adjacent to the useful signal, that is, the channels located beyond the frequency band of the desired channel and centered on the zero frequency.

The filter FPBAI is a low-filtering-order analog filter. In the particular case of a low-order filter of order 1 and of cutoff frequency $f_0$, this means that a signal with a frequency equal to $10.f_0$ will be attenuated by 20 decibels. To obtain a greater attenuation at the frequency $10.f_0$, either a higher-order filter is chosen (a filter of order 2 will give an attenuation of 40 decibels at $10.f_0$), or a cutoff frequency $f'_0$ will be chosen that is lower than $f_0$ (because the attenuation increases between $10.f'_0$ and $10.f_0$).

Since the order of the filter is fixed for reasons of cost, footprint and implementation, an effective filtering of the adjacent channels is obtained by choosing a cutoff frequency located in the desired frequency band, that is, in the desired channel. This does, however, have the consequence of also filtering the useful signal. Thus, for the frequencies of the desired frequency band that are greater than the cutoff frequency, the attenuation is at least 3 decibels (this corresponds to the attenuation of the cutoff frequency). The filter FPBAI may therefore distort a part of the signal.

On the other hand, the adjacent channels are filtered despite the low order of the filter FPBAI. Thus, the analog/digital conversion of the signal obtained at the output of the filter FPBAI may use a lower dynamic range, that is a smaller number of bits.

The analog signal at the output of the filter FPBAI is digitized in an analog/digital converter ADCI. Ideally, the sampling will make it possible to retain the information when the sampling frequency is equal to at least twice the highest frequency of the signal to be sampled. Because the cutoff frequency of the filter FPBAI is chosen deliberately to be low, the sampling frequency can also be chosen to be low. Moreover, since the analog filtering has been significant, the quantity of information in the filtered signal, including outside the useful signal, is reduced. The signal can then be digitized with a smaller number of bits.

There now follows a more detailed description of the internal structure of the digital processing stage ETN. The stage ETN comprises a reformatting filter FRFI. The filter FRFI is a digital filter, for example a finite impulse response filter whose transfer function is chosen to be equal or roughly equal to the inverse of the transfer function of the filter FPBAI over at least the desired frequency band, that is, in the channel of the desired signal.

This filter FRFI makes it possible to reconstruct the incoming signal both inside and outside the desired frequency band. There is therefore at the output of the filter FRFI a signal close to that outgoing from the mixer MXI. A repeat digital filtering, for example low-pass or bandpass, is then performed in order to once again filter the adjacent channels reformatted by the filter FRFI.

The digital processing stage ETN thus comprises a digital filter FPBNI for filtering the adjacent channels. However, the digital filter FPBNI can now have a high order, since it is easier, less bulky and less costly to produce a high order digital filter than a high order analog filter. It is therefore possible to produce a filter FPBNI capable of filtering the adjacent channels with little or no distortion of the useful signal.

Thus, with the device as described, it is possible to produce the filtering of the useful signal with a digital filter without using an analog/digital converter having a high dynamic range.

The filter FRFI and the filter FPBNI can be produced within one and the same digital filter FNI. For this, it is sufficient to multiply the respective transfer functions of the two filters FRFI and FPBNI and digitally produce the resulting filter FNI. Producing one and the same filter handling both the reformatting of the signal and the high-order low-pass filtering makes it possible to simplify the production of the device and improve the useful signal obtained.

The final signal obtained on the channel I is then sent to a block BTDS for processing and demodulating the signal. The block BTDS also receives a signal from the channel Q and can then perform the conventional channel decoding processing operations, in particular demodulation, and source decoding operations. The block BTDS can be implemented by software in a processor.

Figure 2:
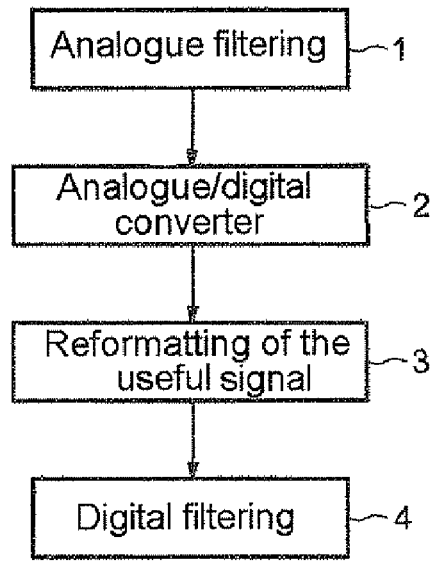
FIG. 2 diagrammatically illustrates the various steps of the method of processing the incoming analog signal according to a first embodiment of the present invention.

FIG. 2 represents a diagram summarizing the various steps in implementing a method according to one aspect. Thus, there is provided a first step 1 during which an analog filtering of the incoming signal is performed. The analog filtering is in this case chosen deliberately to be low, that is, at least a part of the useful signal is also filtered, in order to limit the frequency width of the filtered signal. In a second step 2, the analog signal is converted to a digital signal. With the analog filtering, the digital signal requires a smaller number of bits.

In a third step 3, the digital signal is reformatted to compensate the distortion of the useful signal. This reformatting can be performed in particular by using a filter whose transfer function is equal to the inverse of that of the analog filtering.

Once the digital signal has been reformatted, the adjacent channels are once again filtered because they have also been reformatted during the third step 3. Thus, the fourth step 4 comprises a digital filtering of the reformatted signal in order to keep the useful signal. In particular, the final digital filtering can be performed with a much higher order than the analog filtering, which may make it possible to filter the adjacent channels without distorting the useful signal.

There now follows a more detailed description of the third step 3. It is assumed in a first embodiment that the reformatting filter FRFI is clocked at a working frequency equal to the sampling frequency of the analog/digital converter ADCI. The filter FRFI then has a transfer function equal to the inverse of the transfer function of the filter FPBAI.

For example, the filter FPBAI is a filter of order 1 whose digital equivalent transfer function F is expressed in the form:

$$F(f) = \frac{1-\beta}{1-\beta e^{-2i\pi \frac{f}{F_s}}},$$

where $\beta$ is an integer and $F_S$ is the sampling frequency.

The filter FRFI is then chosen to present a transfer function H equal to:

$$H(f) = F^{-1}(f) = \frac{1-\beta e^{-2i\pi \frac{f}{F_s}}}{1-\beta}$$

Those skilled in the art will easily be able to produce this transfer function H digitally. In a second embodiment, the case is considered where the filter FRFI is clocked at a working frequency $F_S/N_{div}$ that is different from the sampling frequency $F_S$ of the analog/digital converter ADCI. The function H may no longer be determined as previously and the transfer function of the reformatting filter FRFI is then an approximation $H_{approx}$ of the inverse H of the transfer function of the filter FPBAI. This approximation $H_{approx}$ is the closest to the function H in the band of the signal that is to be reformatted.

Figure 3:
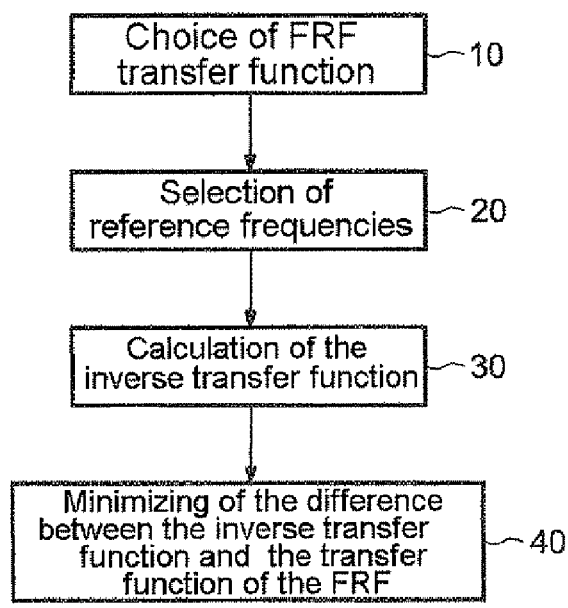
FIG. 3 diagrammatically illustrates the various steps of the method of processing the incoming analog signal according to a second embodiment of the present invention.

FIG. 3 is a flow diagram for determining an approximate transfer function of the function H. The case is considered in which the filter FRFI is a finite impulse response filter of order $N_{fir}$. The transfer function $H_{approx}$ of the filter FRSI is then expressed in the form:

$$H_{approx} = \alpha_0 + \alpha_1 e^{2i\pi \frac{f}{N_{div}F_s}} + \alpha_2 e^{2i\pi \frac{2f}{N_{div}F_s}} + \ldots + \alpha_{Nfir-1} e^{2i\pi \frac{(Nfir-1)f}{N_{div}F_s}}$$

The determination of the approximate transfer function $H_{approx}$ comprises the determination of the coefficients [$\alpha_0$; $\alpha_1$; ...; $\alpha_{Nfir-1}$] minimizing the difference between the transfer function H and the function $H_{approx}$ over the bandwidth of the useful signal.

In a first step 10, a choice is therefore made as to the form of the transfer function $H_{approx}$ and, more particularly, the order of the transfer function $H_{approx}$ that provides the number of coefficients [$\alpha_0$; $\alpha_1$; ...; $\alpha_{Nfir-1}$] to be determined.

In a second step 20, a choice is made as to a finite number of reference frequencies $f_1, f_2, \ldots, f_{Nfrq}$ for which the difference between the two transfer functions H and $H_{approx}$ will be minimized. The choice of these frequencies and their number will directly determine the accuracy of the approximation, as well as the complexity of the calculation of $H_{approx}$. Thus, reference frequencies that are uniformly distributed within the wanted frequency band will preferably be chosen.

A vector $F_{ref}$ is then constructed, the coordinates of which are the previously determined reference frequencies, then, in a third step 30, the vector $H_{ref}$ is calculated, the coordinates of which are the values of the transfer function H for each of the reference frequencies.

The following therefore applies:

$$F_{ref} = \begin{bmatrix} f_1 \\ f_2 \\ \ldots \\ f_{Nfrq} \end{bmatrix}$$

and:

$$H_{ref} = H(F_{ref}) = H\left(\begin{bmatrix} f_1 \\ f_2 \\ \ldots \\ f_{Nfrq} \end{bmatrix}\right) = \begin{bmatrix} H(f_1) \\ H(f_2) \\ \ldots \\ H(f_{Nfrq}) \end{bmatrix}.$$

Finally, in a fourth and last step 40, the coefficients [$\alpha_0$; $\alpha_1$; ...; $\alpha_{Nfir-1}$] are calculated in a matrix fashion, so as to minimize the difference between the desired transfer function H and the approximate function $H_{approx}$. The calculation uses a first matrix E defined by:

$$E = \exp\left(-2i\pi \begin{bmatrix} f_1 & f_1^2 & \ldots & f_1^{Nfir-1} \\ f_2 & f_2^2 & \ldots & f_2^{Nfir-1} \\ \ldots & \ldots & \ldots & \ldots \\ f_{Nfrq} & f_{Nfrq}^2 & \ldots & f_{Nfrq}^{Nfir-1} \end{bmatrix}\right)$$

from which the coefficients of $H_{approx}$ are calculated with the following formula:

$$\begin{bmatrix} \alpha_0 \\ \alpha_1 \\ \alpha_2 \\ \ldots \\ \alpha_{Nfir-1} \end{bmatrix} = [E^T E]^{-1} [E^T H_{ref}]$$

Figure 4:
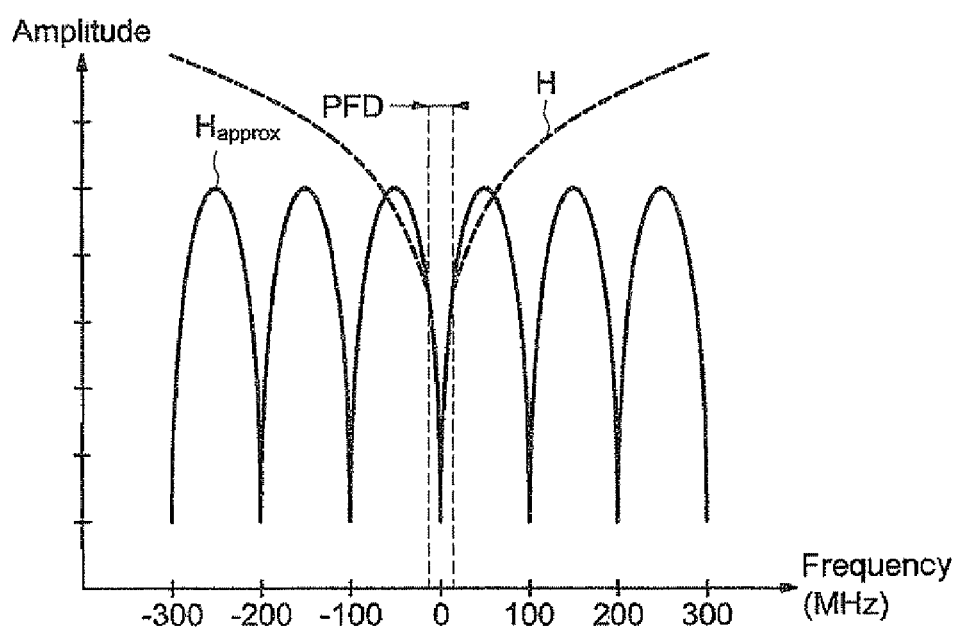
FIG. 4 diagrammatically illustrates the frequency patterns of the inverse and approximate transfer functions of an analog filtering, in accordance with the present invention.
Figure 5:
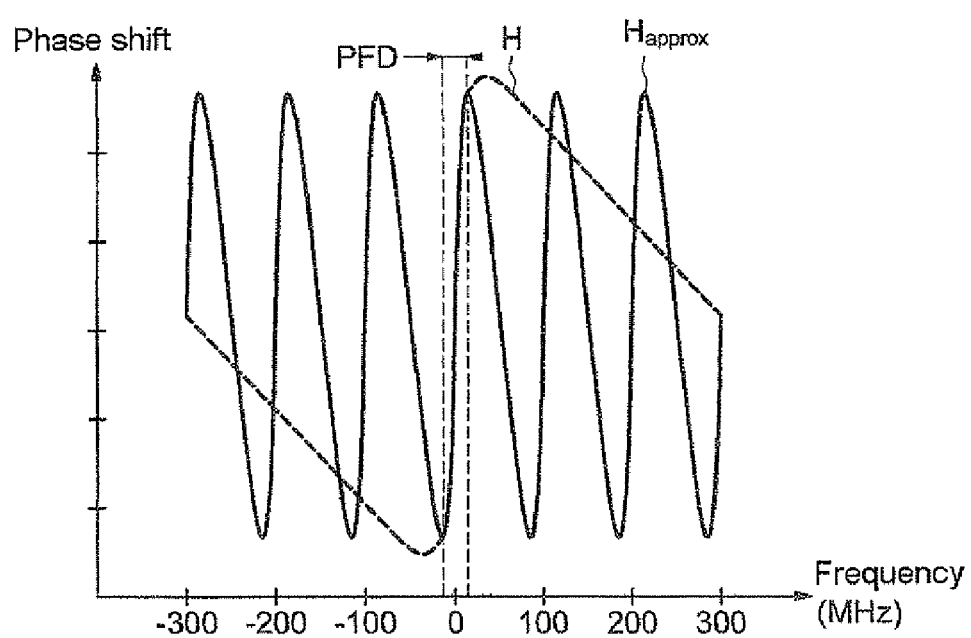
FIG. 5 diagrammatically illustrates the phase diagrams of the inverse and approximate transfer functions of an analog filtering, in accordance with the present invention.

FIGS. 4 and 5 graphically illustrate one example of approximation of a transfer function H by a third-order FIR filter ($N_{fir}=3$), clocked at a frequency 6 times lower ($N_{div}=6$) and with a transfer function $H_{approx}$. FIG. 4 represents the modulus of the two transfer functions and FIG. 5 represents the phase shift. It can be seen that, across the frequency band PFD [−10 MHz; 10 MHz] representing a frequency channel, the curves have similar values.

In a third embodiment, the case is considered in which the filter FRFI is also run at a working frequency $F_S$/NdiV different from the sampling frequency $F_S$ of the analog/digital converter ADCI, and the filter FPBAI is a low-pass filter of order 1 and of cutoff frequency $f_0$. As previously, the transfer function of the reformatting filter FRFI is an approximation $H_{approx}$ of the inverse H of the transfer function of the filter FPBAI. It will also be considered that the filter FRFI is of the finite-impulse-response type of order $N_{fir}=2N-1$. The transfer function $H_{approx}$ of the filter FRFI can be written in the form:

$$H_{approx} = 1 + \sum_{n=1}^{n=N-1} \alpha_n(z^n - z^{-n}) \text{ with } z^{-n} = e^{2i\pi n \frac{f}{N_{div}F_s}}$$

which corresponds, with a shift of $z^{-N+1}$, to $$\sum_{m=0}^{m=N_{fir}-1} \alpha'_m z^{-m}.$$

The determination of the approximate transfer function $H_{approx}$ comprises the determination of the coefficients $[\alpha_1; \ldots; \alpha_{N-1}]$. When the filter FPBAI is of order 1, the coefficients $[\alpha_1; \ldots; \alpha_{N-1}]$ may be calculated directly from the matrix equation:

$$\begin{bmatrix} 1 & 2 & \ldots & N \\ 1 & 8 & \ldots & N^3 \\ \ldots & \ldots & \ldots & \ldots \\ 1 & 2^{2N-3} & \ldots & N^{2N-3} \end{bmatrix} \begin{bmatrix} \alpha_1 \\ \alpha_2 \\ \ldots \\ \alpha_{N-1} \end{bmatrix} = \begin{bmatrix} F_S/2\pi N_{div}f_0 \\ 0 \\ \ldots \\ 0 \end{bmatrix}$$

Gives:
for $N_{fir}=3$:

$$H_{approx} = 1 + \frac{1}{4\pi} \frac{F_S}{N_{div}f_0} [z - z^{-1}]$$

which corresponds, with a time shift of $z^{-1}$, to:

$$\frac{1}{4\pi} \frac{F_S}{N_{div}f_0} + z^{-1} - \frac{1}{4\pi} \frac{F_S}{N_{div}f_0} z^{-2}.$$

for $N_{fir}=5$:

$$H_{approx} = 1 + \frac{1}{4\pi} \frac{F_S}{N_{div}f_0} \frac{1}{6}[-z^2 + 8z - 8z^{-1} + z^{-2}]$$

which corresponds, with a time shift of $z^{-2}$ to:

$$z^{-2} + \frac{1}{4\pi} \frac{F_S}{N_{div}f_0} \frac{1}{6}[-1 + 8z^{-1} - 8z^{-3} + z^{-4}]$$

for $N_{fir}=7$:

$$H_{approx} = 1 + \frac{1}{4\pi} \frac{F_S}{N_{div}f_0} \frac{1}{30}[z^3 - 9z^2 + 45z - 45z^{-1} + 9z^{-2} - z^{-3}]$$

which corresponds, with a time shift of $z^{-3}$, to:

$$z^{-3} + \frac{1}{4\pi} \frac{F_S}{N_{div}f_0} \frac{1}{30}[1 - 9z^{-1} + 45z^{-2} - 45z^{-4} + 9z^{-5} - z^{-6}]$$

The order $N_{fir}$ of the filter FRFI makes it possible to adjust, over the desired frequency band, the approximation of the inverse of the transverse function of the filter FPBAI.

It is then in particular possible to defer the difficulties of design of filters and of the analog/digital converter to the digital part, whatever the working frequency of the digital filters and the sampling frequency of the converter.

The invention claimed is:

1. A method for processing of an initial radio frequency signal comprising:
   generating an incoming analog signal based upon a frequency transposition of the initial radio frequency signal;
   performing an analog filtering of the incoming analog signal so as to filter frequency components located outside a desired frequency band;
   converting the filtered analog signal to a digital signal;
   reformatting the digital signal into a form that is based upon, at least in the desired frequency band, to a form of the incoming analog signal, the reformatting being performed within a digital reformatting filter having a working frequency that is different from a sampling frequency of the analog/digital conversion, and a transfer function whose coefficients are the result of an approximation of the inverse of a transfer function of the analog filtering, at least in the desired frequency band; and
   performing a further digital filtering of the reformatted digital signal so as to further filter the frequency components located outside the desired frequency band.

2. A method according to claim 1 wherein a determination of the coefficients comprises a selection of reference frequencies chosen from the desired frequency band and, for each of these reference frequencies, a minimizing of the difference between the corresponding value of the inverse transfer function of the analog filtering and the corresponding value of the transfer function of the digital reformatting filter.

3. A method according to claim 1 wherein the reference frequencies are chosen uniformly from the desired frequency band.

4. A method according to claim 1 wherein the digital reformatting filter comprises a finite impulse response filter.

5. A method according to claim 1 wherein the reformatting and the further digital filtering are performed within one and the same filter whose transfer function, at least in the desired frequency band, is equal to the product of the transfer function of the digital reformatting filter and the transfer function of the further digital filter.

6. An electronic device comprising:
   an input for receiving an incoming analog signal;
   an analog filter to filter the incoming signal so as to filter frequency components located outside a desired frequency band, the filtering resulting in a distortion of the incoming analog signal in the desired frequency band;

an analog/digital converter to convert the filtered analog signal to a digital signal;

filtering circuitry to reformat the digital signal into a form that is based upon an initial form of the incoming analog signal, at least in the desired frequency band, so as to correct the distortion of the incoming analog signal in the desired frequency band provoked by the analog filtering, and to perform a further digital filtering of the reformatted digital signal so as to further filter the frequency components located outside the desired frequency band;

the filtering circuitry comprising reformatting circuitry to reformat the digital signal into the form that is based upon the initial form of the incoming analog signal, at least in the desired frequency band, and additional digital filtering circuitry to perform the further digital filtering of the reformatted digital signal so as to further filter the frequency components located outside the desired frequency band;

the reformatting circuitry comprising a digital reformatting filter having a working frequency equal to a sampling frequency of the analog/digital converter and having an inverse transfer function of a transfer function of the analog filter at least in said desired frequency band.

7. An electronic device according to claim 6 wherein the analog filter comprises a first order analog filter; and wherein the approximation of the inverse of the transfer function of the analog filtering is based upon an order of the digital reformatting filter.

8. An electronic device according to claim 6 wherein the digital reformatting filter comprises a finite impulse response filter.

9. An electronic device according to claim 6 wherein said input, analog filter, analog/digital converter, reformatting circuitry, and additional digital filtering circuitry are produced in a form of an integrated circuit.

10. An electronic device according to claim 6 further comprising a frequency transposition stage coupled to said input to deliver the incoming analog signal thereto to define a receiver.

11. An electronic device according to claim 6 wherein a transfer function of said filtering circuitry is based upon the reformatting of the digital signal and the further digital filtering.

12. A method for processing an incoming analog signal comprising:

performing an analog filtering of the incoming analog signal so as to filter frequency components located outside a desired frequency band;

converting the filtered analog signal to a digital signal;

reformatting the digital signal into a form that is based upon, at least in the desired frequency band, the form of the incoming analog signal; and performing a further digital filtering of the reformatted digital signal so as to further filter the frequency components located outside the desired frequency band, the reformatting being performed within a digital reformatting filter having a working frequency equal to a sampling frequency of the analog/digital conversion and an inverse transfer function of a transfer function of the analog filtering at least in the desired frequency band.

13. A method according to claim 12 wherein the incoming signal is a baseband signal resulting from a frequency transposition of an initial radio frequency signal.

14. A method according to claim 12 wherein the incoming signal is a baseband signal resulting from a frequency transposition of an initial radio frequency signal.

15. A method for processing an incoming analog signal comprising:

performing an analog filtering of the incoming analog signal so as to filter frequency components located outside a desired frequency band;

converting the filtered analog signal to a digital signal;

reformatting the digital signal into a form that is based upon, at least in the desired frequency band, the form of the incoming analog signal; and performing a further digital filtering, of the reformatted digital signal so as to further filter the frequency components located outside the desired frequency band, the reformatting being performed within a digital reformatting filter having a working frequency that is different from a sampling frequency of the analog/digital conversion, and a transfer function whose coefficients are a result of an approximation of an inverse of a transfer function of the analog filtering, at least in the desired frequency band.

16. A method according to claim 15 wherein a determination of the coefficients comprises a selection of reference frequencies chosen from the desired frequency band and, for each of these reference frequencies, a minimizing of a difference between a corresponding value of the inverse transfer function of the analog filtering and a corresponding value of a transfer function of the digital reformatting filter.

17. A method according to claim 16 wherein the reference frequencies are chosen uniformly from the desired frequency band.

18. A method according to claim 16 wherein the digital reformatting filter comprises a finite impulse response filter.

19. A method according to claim 16 wherein the reformatting and the further digital filtering are performed within a same filter whose transfer function, at least in the desired frequency band, is equal to a product of a transfer function of the digital reformatting filter and the transfer function of the further digital filter.

20. A method according to claim 15 wherein the analog filtering comprises a first order analog filtering; and wherein the approximation of the inverse of the transfer function of the analog filtering is based upon an order of the digital reformatting filter.

21. An electronic device comprising:

an input for receiving an incoming analog signal;

an analog filter to filter the incoming signal so as to filter frequency components located outside a desired frequency band, the filtering resulting in a distortion of the incoming analog signal in the desired frequency band;

an analog/digital converter to convert the filtered analog signal to a digital signal;

filtering circuitry to reformat the digital signal into a form that is based upon an initial form of the incoming analog signal, at least in the desired frequency band, so as to correct the distortion of the incoming analog signal in the desired frequency band provoked by the analog filtering, and to perform a further digital filtering of the reformatted digital signal so as to further filter the frequency components located outside the desired frequency band;

the filtering circuitry comprising reformatting circuitry to reformat the digital signal into the form that is based upon the initial form of the incoming analog signal, at least in the desired frequency band, and additional digital filtering circuitry to perform the further digital filtering of the reformatted digital signal so as to further filter the frequency components located outside the desired frequency band;

the reformatting circuitry comprising a digital reformatting filter having a working frequency that is different from a sampling frequency of the analog/digital converter and having a transfer function whose coefficients are a result of an approximation of an inverse of a transfer function of the analog filter, at least in the desired frequency band.

22. An electronic device according to claim 21 wherein the coefficients are determined so that, for each frequency taken from a group of reference frequencies chosen from the frequency band, the difference between the corresponding value of the inverse transfer function of the analog filter and the corresponding value of the transfer function of the digital reformatting filter is minimal.

23. An electronic device according to claim 21 wherein said input, analog filter, analog/digital converter, reformatting circuitry, and additional digital filtering circuitry are produced in a form of an integrated circuit.

24. An electronic device according to claim 21 further comprising a frequency transposition stage coupled to said input to deliver the incoming analog signal thereto to define a receiver.

25. An electronic device according to claim 21 wherein a transfer function of said filtering circuitry is based upon the reformatting of the digital signal and the further digital filtering.

* * * * *

UNITED STATES PATENT AND TRADEMARK OFFICE
CERTIFICATE OF CORRECTION

PATENT NO. : 7,705,760 B2
APPLICATION NO. : 12/015093
DATED : April 27, 2010
INVENTOR(S) : Joet It is certified that error appears in the above-identified patent and that said Letters Patent is hereby corrected as shown below:

| | |
|---|---|
| Title Page, TITLE | Delete: "METHOD AND DEVICE FOR THE FILTERING AND ANALOGUE/DIGITAL CONVERSION OF ANALOGUE SIGNAL" Insert: --METHOD AND DEVICE FOR THE FILTERING AND ANALOG/DIGITAL CONVERSION OF ANALOG SIGNAL-- |
| Column 1, Line 2 | Delete: "ANALOGUE/DIGITAL" Insert: --ANALOG/DIGITAL-- |
| Column 1, Line 3 | Delete: "ANALOGUE" Insert: --ANALOG-- |
| Column 5, Line 43 | Delete: "SFPBAI" Insert: --FPBAI-- |
| Column 7, Line 49 | Delete: "FRSI" Insert: --FRFI-- |
| Column 9, Line 53 | Delete: "$N_{tir}$" Insert: --$N_{fir}$-- |

Signed and Sealed this

Twenty-eighth Day of September, 2010

David J. Kappos
*Director of the United States Patent and Trademark Office*